US009241195B2

(12) United States Patent
Adimatyam et al.

(10) Patent No.: US 9,241,195 B2
(45) Date of Patent: Jan. 19, 2016

(54) SEARCHING RECORDED OR VIEWED CONTENT

(75) Inventors: Venkata S. Adimatyam, Irving, TX (US); Sameer Vasant Gavade, Irving, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 12 days.

(21) Appl. No.: 12/940,154

(22) Filed: Nov. 5, 2010

(65) Prior Publication Data

US 2012/0117057 A1    May 10, 2012

(51) Int. Cl.
| | |
|---|---|
| G06F 17/30 | (2006.01) |
| H04N 21/482 | (2011.01) |
| H04N 21/4147 | (2011.01) |
| H04N 21/475 | (2011.01) |
| H04N 21/4788 | (2011.01) |

(52) U.S. Cl.
CPC ...... *H04N 21/4828* (2013.01); *G06F 17/30796* (2013.01); *G06F 17/30817* (2013.01); *G06F 17/30828* (2013.01); *H04N 21/4147* (2013.01); *H04N 21/4751* (2013.01); *H04N 21/4788* (2013.01)

(58) Field of Classification Search
CPC ................ G06F 17/30867; G06F 17/3087
USPC ............................................. 707/723; 725/35
See application file for complete search history.

(56) References Cited

U.S. PATENT DOCUMENTS

| 6,005,597 | A  | * | 12/1999 | Barrett et al. ................. 725/46 |
|---|---|---|---|---|
| 7,774,232 | B2 | * | 8/2010 | Pfleging et al. ................ 705/16 |
| 8,074,882 | B2 | * | 12/2011 | Dmitriev et al. .............. 235/383 |
| 2002/0157095 | A1 | * | 10/2002 | Masumitsu et al. ........... 725/46 |
| 2002/0199188 | A1 | * | 12/2002 | Sie et al. ........................ 725/35 |
| 2004/0204820 | A1 | * | 10/2004 | Diaz ............................. 701/200 |
| 2006/0048189 | A1 | * | 3/2006 | Park et al. ...................... 725/46 |
| 2006/0122984 | A1 | * | 6/2006 | Byers et al. ...................... 707/3 |
| 2006/0206912 | A1 | * | 9/2006 | Klarfeld et al. ................ 725/40 |
| 2006/0251382 | A1 | * | 11/2006 | Vronay et al. .................. 386/52 |
| 2006/0271961 | A1 | * | 11/2006 | Jacoby et al. .................. 725/46 |
| 2007/0130595 | A1 | * | 6/2007 | McElhatten et al. ........... 725/88 |
| 2007/0154171 | A1 | * | 7/2007 | Elcock et al. .................. 386/83 |
| 2008/0159622 | A1 | * | 7/2008 | Agnihotri et al. ............ 382/157 |
| 2009/0019009 | A1 | * | 1/2009 | Byers ............................... 707/3 |
| 2009/0113475 | A1 | * | 4/2009 | Li .................................. 725/39 |
| 2009/0138805 | A1 | * | 5/2009 | Hildreth ........................ 715/745 |
| 2009/0190804 | A1 | * | 7/2009 | Yokoi ........................... 382/118 |
| 2010/0192172 | A1 | * | 7/2010 | Thomas et al. ................... 725/9 |
| 2010/0199295 | A1 | * | 8/2010 | Katpelly et al. ............... 725/14 |
| 2010/0205628 | A1 | * | 8/2010 | Davis et al. .................... 725/25 |
| 2011/0035771 | A1 | * | 2/2011 | Ward et al. ..................... 725/34 |
| 2011/0135114 | A1 | * | 6/2011 | Oba et al. ..................... 381/107 |
| 2011/0164143 | A1 | * | 7/2011 | Shintani et al. ............ 348/222.1 |

* cited by examiner

*Primary Examiner* — Cam-Y Truong

(57) ABSTRACT

A method may include receiving a request from a user to play or record a program, wherein the program is associated with dialog text and determining a user profile associated with the user. The method may include associating, in response to receiving the request, the dialog text of the requested program with the user profile. The method may include receiving a search query from the user associated with the user profile and searching the dialog text associated with the user for dialog text that matches the search query. The method may include transmitting, for display, an identification of the program associated with the matching dialog text.

21 Claims, 11 Drawing Sheets

PROGRAM METADATA TABLE 500

| CONTENT ID 502 | CONTENT TITLE 504 | DATE REC'D 506 | CAPTIONS 510 | PRESENCE 512 | RECOGNIZED OBJECTS 514 |
|---|---|---|---|---|---|
| 0246467 | "EVERY-BODY LOVES CARL" season 2, episode 13 | 05 Mar 2010 | ...<scene no='2' t='5:00'><img src='s2d2.jpg'/> <dialog p='Carl' t='5:00'>You're just in time. I believe I've created an algorithm for generating a social graph of friendships.<img src='s2d1.webp'/></dialog> <dialog p='Ilsam' t='5:03.1'>Carl, I've never heard of such an algorithm.<img src='s2d2.webp'/></dialog> <dialog p='praveen' t='5:05.2'>Hear him out, if he's really on to something, we could always start a website and make some money.<img src='s2d3.jpg'/></dialog> ...</scene>... | 569.45 (SCENES= NONE); 682.97 (SCENES= 1,2,3); 589.435 (SCENES= ALL) | scene two: (Sean Haggerty, John Park, Jake Gannon, whiteboard, Norton sofa) |
| 7369410 | "THE NEW FRANCE" | 10 Mar 2010 | ...<scene no='29' t='50:00'><img src='eiffel.jpg'/> <dialog p='Dr. West'>Is it true that the formula for Eiffel's success was his friendship with the political leader?</dialog> <dialog p='Dr. Ekberg'>That is the myth anyway.</dialog> ...</scene>... | 2010-03-05 | eiffel tower, Sara West, Helen Ekberg |
| 51297468 | "EVENING NEWS" | 15 Sept 2010 | ...<scene no='59' t='1:10'> <img src='capture 234.jpg'/></dialog> <dialog t='1:13' p='Brian Williams'>The trading algorithm that caused the flash crash has strained some long standing friendships on Wall Street.<img src='capture234.jpg'/></dialog> ...</scene>... | 2010-03-05 | Brian Johnson, globe, stock chart |
| ... | ... | ... | ... | ... | ... |

FIG. 5

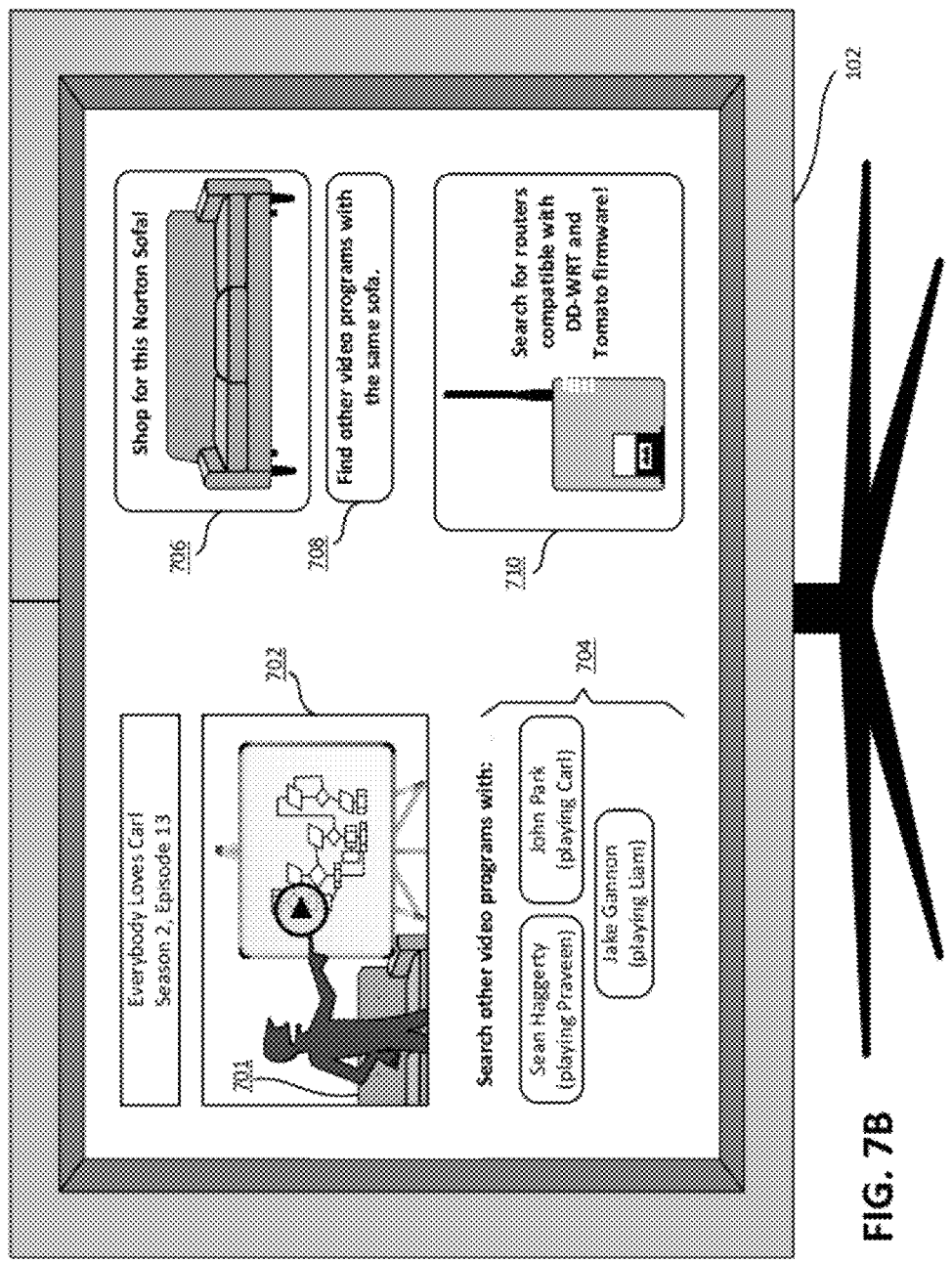

SEARCHING RECORDED OR VIEWED CONTENT

BACKGROUND INFORMATION

Television program guides typically provide consumers of television and radio content with information about current and upcoming programming, such as broadcast times, broadcast channels, and program synopses. Program synopses tend to be short and lacking in detail. Consumers may search the program guide for current and upcoming content.

While watching a program, the consumer may select an option to watch the "closed captions" or "subtitles" provided with the program. The closed captions or subtitles may include the text of the dialog in the program in different languages, for example. Sometimes closed captions or subtitles may include non-speech elements, such as the identity of the person speaking.

BRIEF DESCRIPTION OF THE DRAWINGS

FIG. 5 is a diagram of an exemplary program metadata table stored in the set-top box or search server of FIG. 2;

FIGS. 7A and 7B are diagrams of an exemplary user interface for a user to search for and discover content.

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Figure 1:
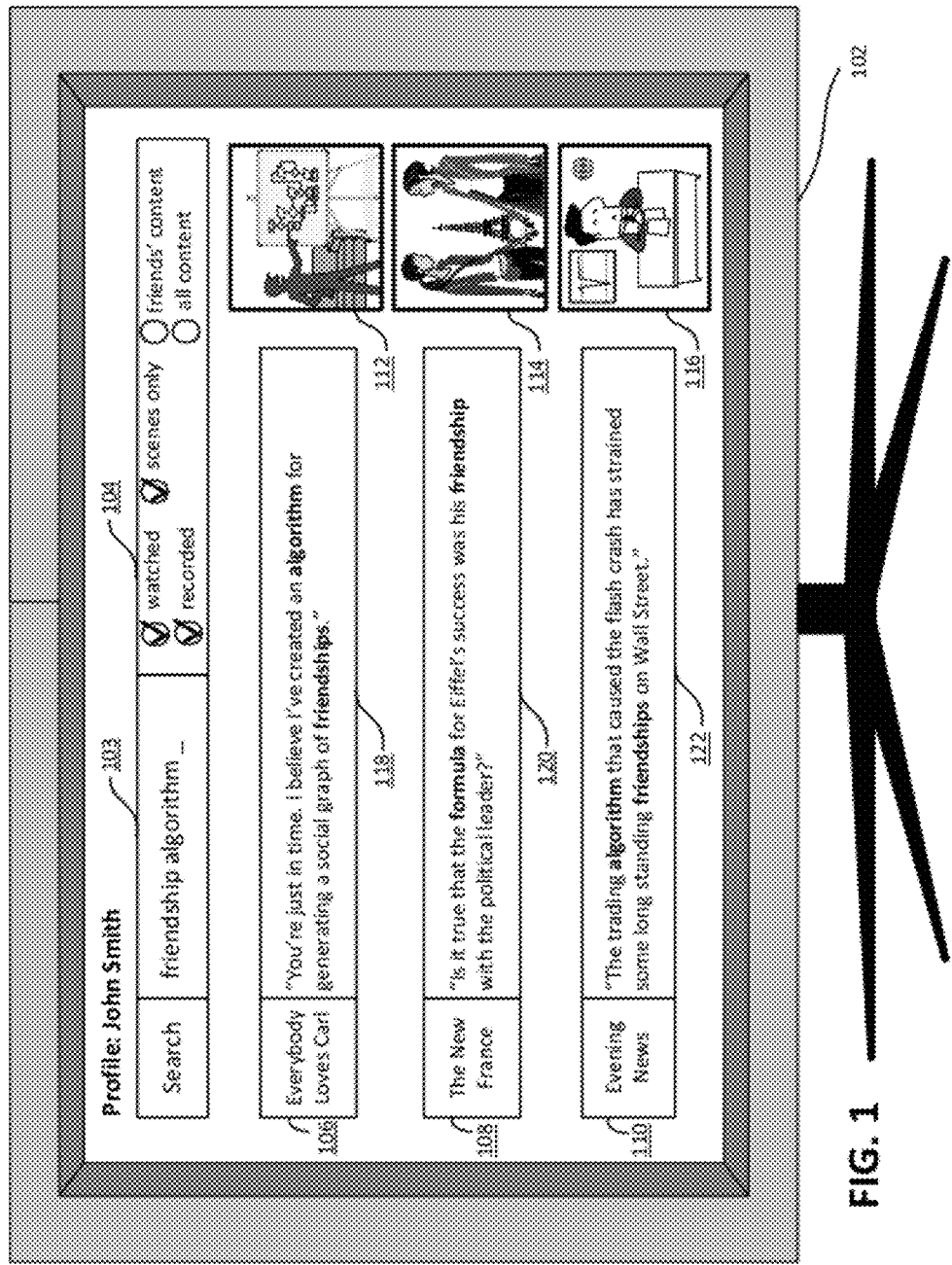
FIG. 1 is a diagram of an overview of an exemplary embodiment for searching for and discovering content.

In one embodiment, a user may program a set-top box (STB) having a digital video recorder (DVR) to record content, such as a television program. While recording the content, the DVR may store the closed captions (e.g., dialog text) and other data in a metadata database along with the content. In one embodiment, a user may search for content by entering search terms. For example, the user may search for content that is associated with dialog that matches the user's search terms. FIG. 1 is a diagram of an overview of an exemplary embodiment for searching content. As shown in FIG. 1, a user John Smith searches for the terms "friendship" and "algorithm," as indicated on a display 102 in a search box 103. As shown in a search options box 104, John searches for content matching his criteria that he has already "watched" as indicated by a check box next to the "watched" option. As also shown in options box 104, John also searches for content matching his criteria that he has recorded (e.g., using a digital video recorder or DVR). Further, as shown in options box 104, John is only searching for scenes in content that include his search terms, as opposed to programs that include the terms across multiple scenes.

John's search, identified by the criteria of search box 103 and options box 104, has generated three search results. The search results include a result 106 with the title "Everybody Loves Carl," which is associated with an image 112 and dialog text 118; a result 106 with the title "The New France," which is associated with an image 114 and dialog text 120; and a result 110 with the title "Evening News," which is associated with an image 116 and dialog text 122. John, after viewing the images and corresponding text, may select one of the search results. For example, John may select "Everybody Loves Carl" (e.g., result 106) and start watching the program at the point in the program where the matching dialog is found. As shown, the search results highlight the matching terms from search box 103.

A "program," as the term is used herein, may include any type of content, including audio content, video content, or multimedia content. Further, a portion of a "program" may be considered a "scene," although a program may include only one scene. A "closed caption," a "caption," and a "subtitle" are used herein synonymously. A "caption" includes dialog text transmitted with corresponding content in such a way that the dialog text is associated with the time the dialog is spoken or generated in the corresponding content.

Figure 2:
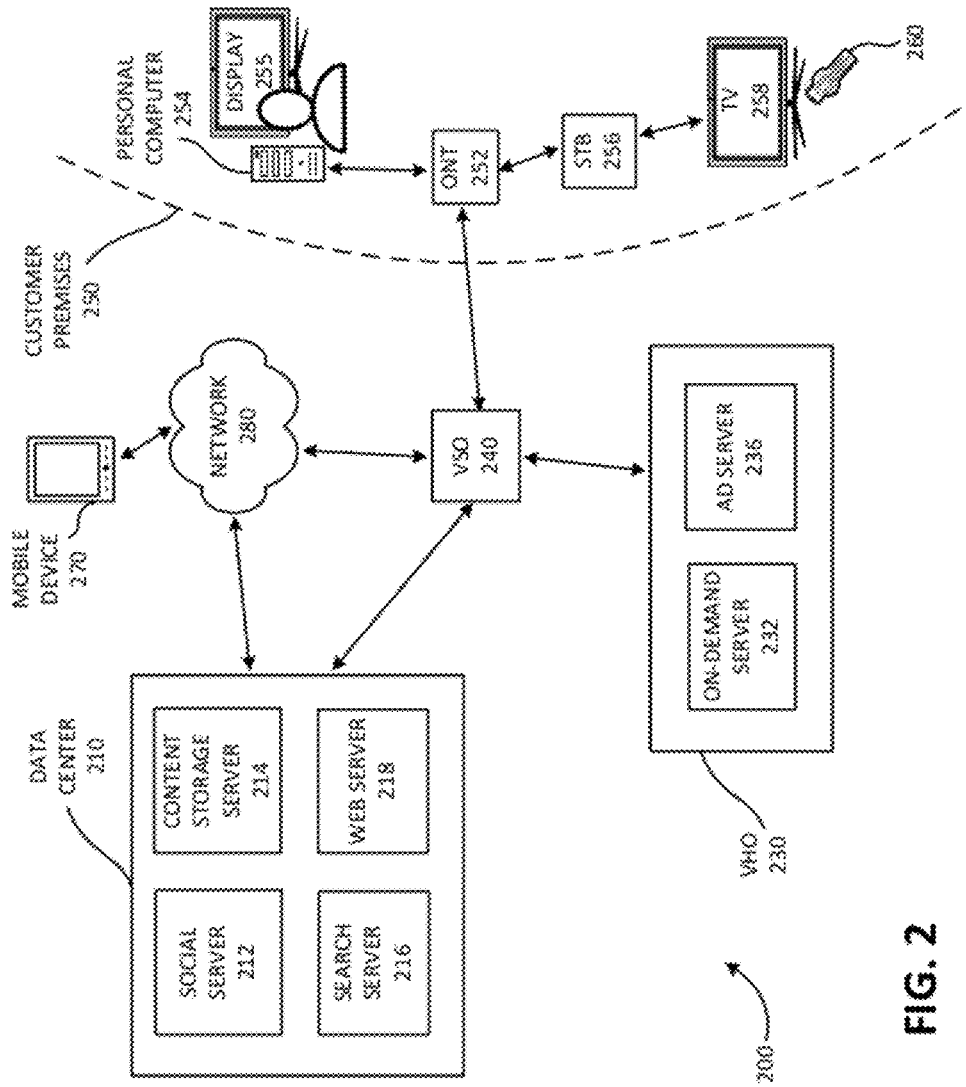
FIG. 2 is a diagram of an exemplary network for implementing the embodiment of FIG. 1 and other embodiments for searching for and discovering content.

FIG. 2 is a diagram of an exemplary network 200 for implementing the embodiment of FIG. 1 and other embodiments. Network 200 may include a data center 210, a video hub office (VHO) 230, a video service office (VSO) 240, customer premises 250, a mobile device 270, and a network 280. VSO 240, VHO 230, data center 210, and other devices in network 200 may form part of a high-speed fiber optic network (e.g., FiOS™)

Customer premises 250 (e.g., a customer's home) may include an optical network terminal (ONT) 252, a personal computer 254, a set-top box (STB) 256, a television 258, and a remote control 260. Devices in customer premises 250 may include one or more computers for hosting programs, such as a program for a user to search for and discover content stored, for example, by a digital video recorder. Devices in customer premises 250 and mobile device 270 may be considered "user devices" or "network devices."

ONT 252 may receive data, e.g., on a fiber optic cable, and may transmit data to the appropriate device in customer premises 250, such as computer 254 or STB 256. Likewise, ONT 252 may receive data from any device in customer premises 250 and may transmit the data to other devices in network 200, e.g., through a fiber optic cable. ONT 252 may provide customer premises 250 with Internet access, television access, or telephone service, for example. In one implementation, network 200 may include a cable modem in customer premises 250 for receiving and transmitting data rather than an optical network terminal.

Computer 254 may include a laptop, a desktop, a tablet computer, a mobile telephone, a personal digital assistant (PDA), or another computation and/or communication device. Computer 254 may include a microphone for capturing audio and/or a camera for capturing images or video. Computer 254 may also include a display 255 for showing images or video or a speaker for playing audio. In one embodiment, display 255 may be display 102 of FIG. 1. Computer 254 may connect to network 280 (e.g., the Internet)

through ONT 252 and VSO 240, for example. Computer 254 may interact with data center 210 to provide a user with the ability to view and search for content. For example, personal computer 254 may provide the user with a browser.

STB 256 may receive content and output the content to TV 258 for display. STB 256 may include a component (e.g., a cable card or a software application) that interfaces with (e.g., plugs into) a host device (e.g., a personal computer, TV 258, a stereo system, etc.) and allows the host device to display content. STB 256 may also be implemented as a home theater personal computer (HTPC), an optical disk player (e.g., digital video disk (DVD) or Blu-Ray™ disc player), a cable card, etc. STB 256 may receive commands or data from other devices in network 200, such as remote control 260, and may transmit data to other devices in network 200 (e.g., to data center 210).

TV 258 may output content received from STB 256, for example. TV 258 may include speakers as well as a display (e.g., display 102 of FIG. 1). Remote control 260 may issue wired or wireless commands for controlling other electronic devices, such as TV 258 or STB 256. Remote control 260, in conjunction with STB 256, may allow a user to interact with an application running on STB 256, such as an application to record and/or search for content. Other types of devices (e.g., a keyboard, mouse, mobile phone, etc.) may be used instead of remote control 260.

Customer premises 250 may connect to VSO 240. VSO 240 may deliver content to customer premises 250 and may receive data from customer premises 250 for forwarding to the proper destination (e.g., data center 210). VSO 240 may include a content server for transcoding and multiplexing content from different sources for delivery to customer premises 250. For example, the VSO 240 may multiplex ads (e.g., from ad server 236) into content from on-demand server 232 or data center 210. For example, ad server 236 may insert ads into search results or programs delivered to customer premises 250.

Mobile device 270 may include a mobile phone, a tablet computer, a laptop, a PDA, or another portable communication device. In one embodiment, mobile device 270 may download and run applications, including applications from Apple's™ App Store, Amazon's™ Application store for Android or Kindle devices, Google's Marketplace for Android devices, Verizon's Application store for Android devices, etc. In one embodiment, mobile device 270 may include a modern, standards-compliant browser that can execute JavaScript, HTML5, etc. In this embodiment, an application running in mobile device 270 may allow for a user to search for, discover, and view content as described herein.

Data center 210 may include one or more servers (e.g., "network devices") that manage and/or store programs and data associated with allowing users to search for and discover. As shown in FIG. 2, data center 210 may include a social server 212, content storage server 214, a search server 216, and a web server 218. Devices in data center 210 may include one or more computers for hosting programs, such as a search engine, a web server (e.g., Apache), a database (e.g., MySQL), or other applications.

Social server 212 may include a database and/or server that stores information about user preferences or other information associated with a user. For example, social server 212 may store lists of users (e.g., friends, family, classmates, etc.) associated with each user. Social server 212 may allow the user to select individuals or groups of people permitted to search through a user's history of viewed or recorded programs, for example.

Content storage server 214 may include a database that stores content. For example, a user may wish to record a program being broadcast to watch at a later time. In one embodiment, the program may be stored in content storage server 214. When the user requests to view the content, the recorded content may be streamed from content storage server 214 to customer premises 250. In another embodiment, the program may be stored locally in customer premises 250 (e.g., STB 256) as described below, for example.

Search server 216 may include one or more programs for allowing users to search for content (e.g., viewed content, recorded content, all content). Search server 216 may include a database and/or server to store metadata that describes content stored in content storage server 214, on-demand server 232, or STB 256. The metadata may include content titles, text dialog, thumbnail images, actor information, etc. The metadata may include extended-markup-language data in, for example, the ScreenplayXML format.

Web server 218 may allow for a user to interface with search server 216, social server 212, and/or content storage server 214 for recording content, sharing content, searching for content, viewing content, etc. Web server 218 may also function as a back-end server to coordinate communications between user devices and social server 212, content storage server 214, and/or search server 216.

VHO 230 may include an on-demand server 232 and an ad server 236. On-demand server 232 may store and provide on-demand content (e.g., including programs from content storage server 214). On-demand server 232 may also include a catalog of programs (e.g., programs stored in content storage server 214) for a user to browse and select. For example, a user in customer premises 250 may select a program through on-demand server 232. Ad server 236 may provide and/or manage the advertising content (e.g., a commercial or a banner ad) that is presented with other content.

Network 280 may include one or more packet switched networks, such as an Internet protocol (IP) based network, a local area network (LAN), a wide area network (WAN), a personal area network (PAN), an intranet, the Internet, a cellular network, a fiber-optic network, or another type of network that is capable of transmitting data. Network 280 may include a circuit-switched network, such as a public-switched telephone network (PSTN) for providing telephone services for traditional telephones. Network 280, in conjunction with components in VSO 240, may allow devices at customer premises 250 (e.g., computer 254 or STB 256) to connect to other devices also attached to network 280.

The exemplary configuration of devices in network 200 is illustrated for simplicity. Network 200 may include more devices, fewer devices, or a different configuration of devices than illustrated in FIG. 2. For example, network 200 may include thousands or millions of customer premises. In some embodiments, the functions performed by two or more devices may be performed by any one device. Likewise, in some embodiments, the functions performed by any one device may be performed by multiple devices. Further, the connections shown in FIG. 2 are exemplary. In other embodiments, additional connections that are not shown in FIG. 2 may exist between devices (e.g., each device may be connected to every other device). The connections in FIG. 2 may also be wireless or wired.

Figure 3:
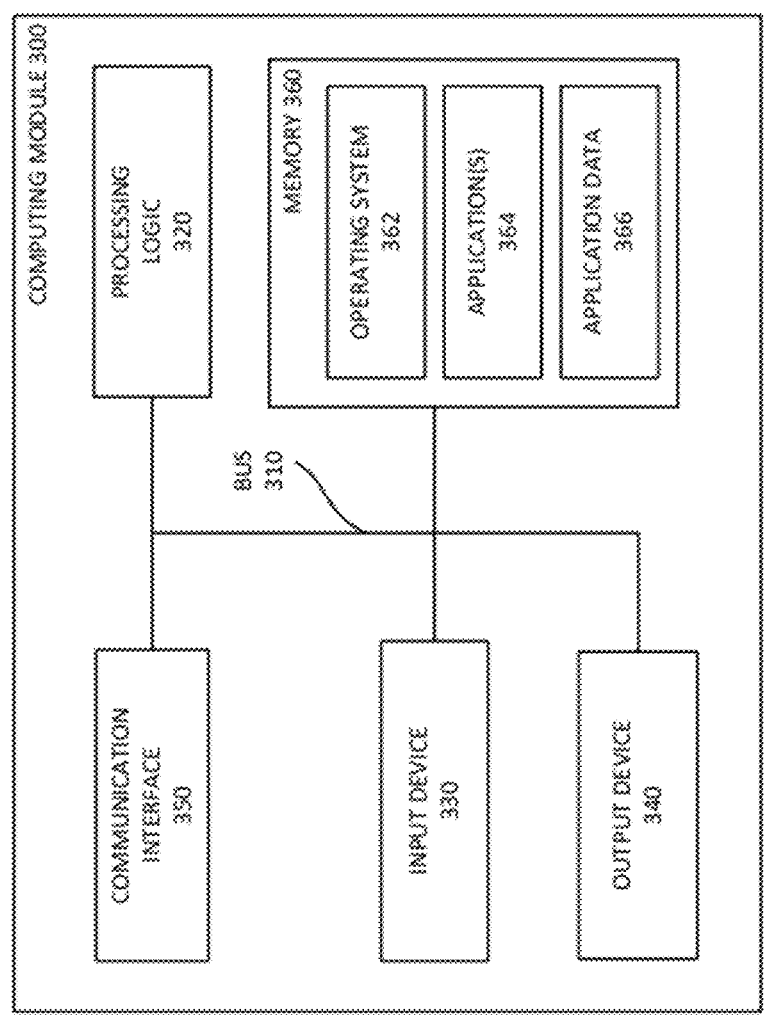
FIG. 3 is a block diagram of exemplary components of a computing module found in the devices of FIG. 2.

Devices in network 200 may each include one or more computing modules. FIG. 3 is a block diagram of exemplary components of a computing module 300. Computing module 300 may include a bus 310, processing logic 320, an input device 330, an output device 340, a communication interface 350, and a memory 360. Computing module 300 may include other components (not shown) that aid in receiving, transmitting, and/or processing data. Moreover, other configurations of components in computing module 300 are possible.

Bus 310 may include a path that permits communication among the components of computing module 300. Processing logic 320 may include any type of processor or microprocessor (or families of processors or microprocessors) that interprets and executes instructions. In other embodiments, processing logic 320 may include an application-specific integrated circuit (ASIC), a field-programmable gate array (FPGA), etc.

Input device 330 may allow a user to input information into computing module 300. Input device 330 may include a keyboard, a mouse, a pen, a microphone, a remote control (e.g., remote control 260), an audio capture device, an image and/or video capture device, a touch-screen display, etc. Some devices in network 200, such as servers in data center 210, may be managed remotely and may not include input device 330. In other words, some devices may be "headless" and may not include a keyboard, for example.

Output device 340 may output information to the user. Output device 340 may include a display, a printer, a speaker, etc. For example, TV 258 and/or personal computer 254 may include display 102 (an output device), which may include a liquid-crystal display (LCD) for displaying content to the user. As another example, ONT 252 and STB 256 may include light-emitting diodes (LEDs). Headless devices, such as servers in data center 210 may be managed remotely and may not include output device 340.

Input device 330 and output device 340 may allow a user to activate and interact with a particular service or application, such as a web browser or an application to search for and discover content. Input device 330 and output device 340 may allow a user to receive and view a menu of options and select from the menu options. The menu may allow the user to select various functions or services associated with applications executed by computing module 300.

Communication interface 350 may include a transceiver that enables computing module 300 to communicate with other devices or systems. Communication interface 350 may include a transmitter that converts baseband signals to radio frequency (RF) signals or a receiver that converts RF signals to baseband signals. Communication interface 350 may be coupled to an antenna for transmitting and receiving RF signals. Communication interface 350 may include a network interface card, e.g., Ethernet card, for wired communications or a wireless network interface (e.g., a WiFi) card for wireless communications. Communication interface 350 may also include, for example, a universal serial bus (USB) port for communications over a cable, a Bluetooth™ wireless interface, a radio-frequency identification (RFID) interface, a near-field communications (NFC) wireless interface, etc.

Memory 360 may store, among other things, information and instructions (e.g., applications 364 and operating system 362) and data (e.g., application data 366) for use by processing logic 320. Memory 360 may include a random access memory (RAM) or another type of dynamic storage device, a read-only memory (ROM) device or another type of static storage device, and/or some other type of magnetic or optical recording medium and its corresponding drive (e.g., a hard disk drive).

Operating system 362 may include software instructions for managing hardware and software resources of computing module 300. For example, operating system 362 may include Linux, Solaris, Windows, OS X, iOS, Android, an embedded operating system, etc. Applications 364 and application data 366 may provide network services or include applications, depending on the device in which the particular computing module 300 is found.

Computing module 300 may perform the operations described herein in response to processing logic 320 executing software instructions stored in a computer-readable medium, such as memory 360. A computer-readable medium may include a physical or logical memory device. The software instructions may be read into memory 360 from another computer-readable medium or from another device via communication interface 350. The software instructions stored in memory 360 may cause processing logic 320 to perform processes that are described herein.

Figure 4A:
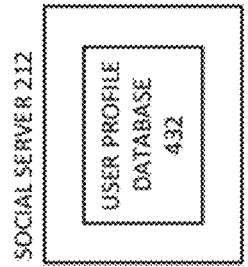
FIG. 4A is a block diagram of exemplary components of the social server of FIG. 2.

As described above with respect to FIG. 2, social server 212 may include information about user preferences. FIG. 4A is a block diagram of exemplary components of social server 212 (e.g., functions performed by application 364 in processing logic 320 or stored in memory 360 of personal computer 254). Social server 212 may include more, fewer, or a different arrangement of components than illustrated in FIG. 4A.

Social server 212 may include a user profile database 432, which may store a database of user profiles. A user profile may store information about a user's preferences or other information associated with a user. User profile database 432 may also store a list of other users (e.g., contacts) associated with a particular user (e.g., friends, classmates, followers, family, etc.). User profile database 432 may identify users or groups of users who may be granted permissions to search content associated with a particular user. User profile database 432 may store other information about a user, including occupation (e.g., teacher, lawyer, engineer, etc.), interests (e.g., football, French history, Irish history, hockey, computers), likes and dislikes (e.g., movies enjoyed, movies not enjoyed, television programs enjoyed, etc.), purchase history (e.g., on-demand programs, etc.), etc. User profile database 432 may associate viewed and/or recorded programs and metadata with a user or group of users. In one embodiment, a user profile may store simply an identification of the user.

Figure 4B:
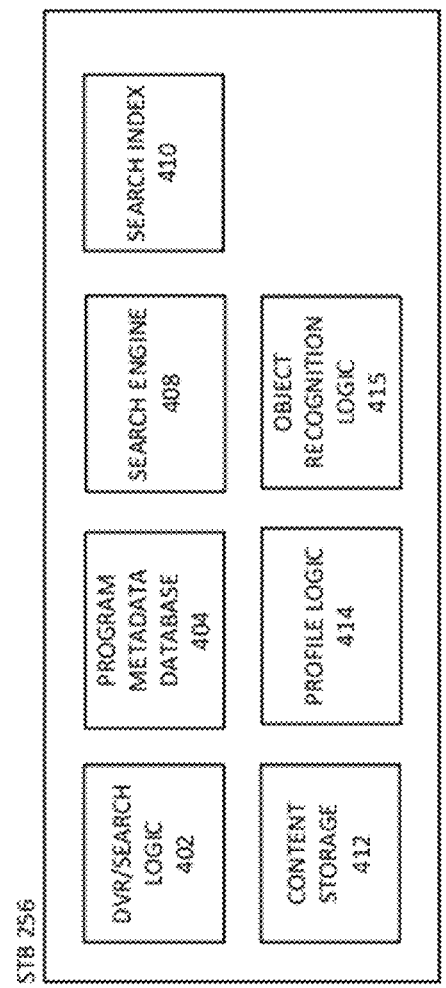
FIG. 4B is a block diagram of exemplary components of the set-top box of FIG. 2.

As described above with respect to FIG. 2, STB 256 may allow a user to search for content that matches user-defined criteria. FIG. 4B is a block diagram of exemplary components of STB 256 (e.g., functions performed by application 364 in processing logic 320 or stored in memory 360 of STB 256). STB 256 may include a DVR/search logic 402, a program metadata database 404, a search engine 408, object recognition logic 415, a search index 410, content storage 412, and profile logic 414.

DVR/search logic 402 (sometimes referred to as "search logic 402") may provide the user with an interface for recording, searching for content, and discovering content. In one embodiment, DVR/search logic 402 may allow a user to program STB 256 to record a program (e.g., at a future time) and store the program in content storage 412 and/or content storage server 214. For example, John Smith may employ DVR/search logic 402 to record the program titled "Everybody Loves Carl," whenever the program is broadcast and/or received in STB 256. DVR/search logic 402 may also provide the user interface on display 102 of FIG. 1. DVR/search logic 402 may also send data back and forth to search server 216, for example, for performing searches for the user. DVR/search logic 402 may also generate program metadata database 404 from content, as described below and with respect to FIG. 5.

Program metadata database 404 ("metadata database 404") may store data regarding content (e.g., dialog text) so that a user can search the content. For example, program metadata database 404 may store dialog text (e.g., captured subtitles), associated thumbnail images, etc. In one embodiment, metadata database 404 may be generated by DVR/search logic 402 as content is being viewed or recorded. Search engine 408 may use information from metadata database 404 to generate search index 410. Search index 410 may include information from program metadata database 404, but arranged in a way to allow search engine 408 to respond to queries more efficiently.

FIG. 5 is a diagram of an exemplary program metadata table 500 ("metadata table 500") that may be stored in metadata database 404. In another embodiment, metadata table 500 may also or alternatively be stored in data center 210 (e.g., in program metadata database 430). In one embodiment, described below, Metadata table 500 may include a content ID field 502, a content title field 504, a date recorded field 506, a captions field 510, a presence field 512, and/or a recognized objects field 514. The fields, data structure, and content in metadata table 500 are exemplary. Metadata table 500 may include fewer, more, or different fields or different data structures than shown in FIG. 5.

Content ID field 502 may include a value identifying (e.g., uniquely identifying) a piece of content. Content title field 504 may include the title, season number, episode number, etc., of the content identified in field 502. For example, record 552-1 of metadata table 500 includes a content ID of 0246467 in content ID field 502 and "'Everybody Loves Carl,' season 2, episode 13" as the title stored in content title field 504. Date recorded field 506 may include information indicating the date the corresponding content was recorded (e.g., stored in content storage 412 or content storage server 214). For example, record 552-1 indicates that the content with content ID of 0246467 was recorded on Mar. 5, 2010.

Captions field 510 may include the dialog text, associated thumbnail images, as well as other information, of the corresponding content. In the example of FIG. 5, the information in caption field 510 is stored in XML format. This format is used for ease of illustration. In other implementations, different formats and data structures may be used. Record 552-1 shows the dialog for a scene (e.g., scene two), as indicated by the "scene" tag and the "no" attribute. Scene two begins at the five-minute mark, as indicated in the "t" attribute. The first scene is associated with an image stored at "s2d1jpg" as indicated by the "src" attribute in the "img" element. Record 552-1 also indicates that the character Carl starts a dialog (indicated with a "dialog" element) at the beginning of the scene (indicated by the "t" attribute). The dialog content in text is "You're just in time. I believe I've created an algorithm for a social graph of friends." The dialog is associated with an image with the filename "s2d1.webp."

Presence field 512 may store information identifying the profile(s) with which the remaining data in the entry is associated. For example, entry 552-1 includes a profile ID of 56945, which corresponds to the profile for John Smith. Thus, the information in fields 502 through 510 for entry 552-1 are associated with John Smith's profile. Presence field 512 may also indicate the scenes, if any, have viewed by a user corresponding to the profile ID. For example, John (profile ID of 56945) has not watched any scenes in the corresponding program (e.g., John has requested the recording of the content, but has not yet viewed the content). Mary Smith (profile ID of 68297), who is also associated with entry 552-1, has viewed the first scene, the second scene, and the third scene of the program identified in content ID field 502. Jane (profile ID of 59435), who is also associated with entry 552-1, has viewed the entire program (e.g., all scenes).

Returning to FIG. 4B, profile logic 414 may identify the users watching TV 258, for example, and their associated profiles (e.g., stored in social server 212) so that search logic 402 and search engine 408 may populate presence field 512, for example. Profile logic 414 may determine the profiles of users by determining the user or users in front of or around TV 258, for example. In one embodiment, profile logic 414 may detect RFID tags carried by users (e.g., using NFC technology, Bluetooth, etc.) and associated with profiles. In another embodiment, profile logic 414 may detect hardware addresses associated with wireless devices (e.g., mobile device 270) and associated with user profiles. In another embodiment, profile logic 414 may use a microphone or a camera and voice/face recognition software (or other biometric devices) to determine the users in front of or nearby TV 258 and their associated profiles. As yet another example, profile logic 414 may detect users and profiles by virtue of a user "logging in" to an account associated with a profile.

Recognized objects field 514 may include a list of objects and/or faces recognized in the scene. Metadata table 500 includes the following objects for the scene described in entry 552-1: whiteboard and Norton sofa (e.g., a brand or type of sofa). Metadata table also recognizes the actors in the scene: Sean Haggerty, John Park, and Jake Gannon. For entry 552-2, the Eiffel tower, Sara West, and Helen Ekberg are recognized and listed. Returning to FIG. 4B, object recognition logic 426 may analyze content to extract information about people and/or objects that appear in the content (e.g., video content or image content). Objection recognition logic 415 may store this information in metadata table 500 (e.g., populate recognized objects field 514).

Figure 4C:
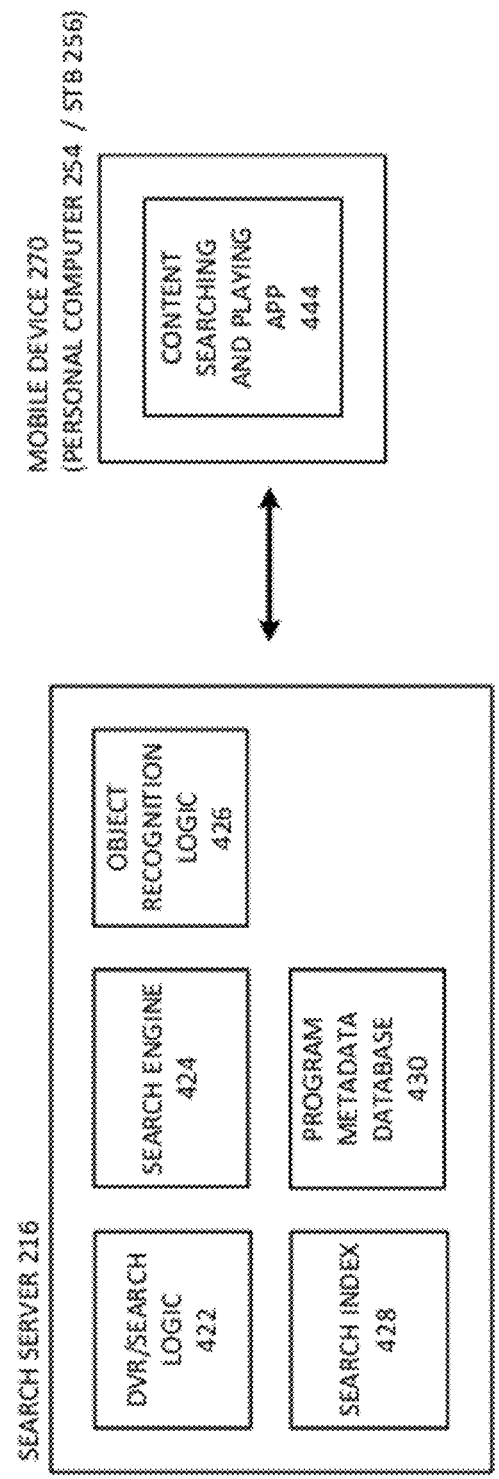
FIG. 4C is a block diagram of exemplary components of the search server of FIG. 2 and exemplary components of the mobile phone, personal computer, or set-top box of FIG. 2.

As described above with respect to FIG. 2, search server 216 in data center 210 may allow a user to search for and discover content. Search server 216 and other devices in data center 210 may perform many the same functions described above with STB 256. In this embodiment, data center 210 may replace or supplement the functionality of STB 256. In other words, the PVR and search functions of STB 256 may be "in the cloud" and provided "over the top" by data center 210 to user devices, such as mobile device 270. FIG. 4C is a block diagram of exemplary components of search server 216 in this embodiment (e.g., functions performed by application 364 in processing logic 320 or stored in memory 360 of search server 216). Search server 216 may include DVR/search logic 422, a search engine 424, object recognition logic 426, a search index 428, and program metadata database 430. Search server 216 may include more, fewer, or a different arrangement of components than illustrated in FIG. 4C.

DVR/search logic 422 (sometimes referred to as search logic 422) may provide DVR and searching services to a user, similar to the services provided by DVR/search logic 402 of STB 256. In this embodiment, DVR/search logic 422 may store content in content storage server 214 rather than in STB 256, for example. Search logic 422 may also generate program metadata database 430. Program metadata database 430 may store metadata table 500 and may be similar to program metadata database 404 described above. Further search engine 424, search index 428, and object recognition logic 426 may perform the same functions and have the same characteristics as search engine 408, search index 410, and object recognition logic 415 described above with respect to STB 256.

As described above with respect to FIG. 2, mobile device 270 may allow a user to interact with components of data center 210 to allow a user to search for, discover, and view content. FIG. 4 also includes a block diagram of exemplary components of mobile device 270 (e.g., functions performed by application 364 in processing logic 320 or stored in memory 360 of mobile device 270). Mobile device 270 may include a content searching and playing application ("app") 444 that may allow a user to search for and discover content (e.g., content recorded on content storage server 214 and/or in STB 256) and play content (e.g., selected from search results). In the embodiment in which data center 210 includes the components of FIG. 4C, STB 256 may include the components shown in FIG. 4C. That is, when DVR and searching functionality, for example, are in "the cloud," then STB 256 may include a light-weight application as shown in FIG. 4C rather than (or in addition to) the components shown in FIG. 4B. Personal computer 254 may be configured similarly to mobile device 270.

Content playing app 444 may include an application (e.g., a light-weight application) purchased or downloaded, for example, from Apple's™ App Store, Amazon's™ Application store for Android or Kindle devices, Google's Marketplace for Android devices, Verizon's Application store for Android devices, etc. In one embodiment, app 444 may include a modern, standards-compliant browser that can execute JavaScript, HTML5, etc. Personal computer 254 may be configured similarly to mobile device 270. In one embodiment, STB 256 may be configured to include app 444 instead of or in addition to the components shown in FIG. 4B.

Figure 6A:
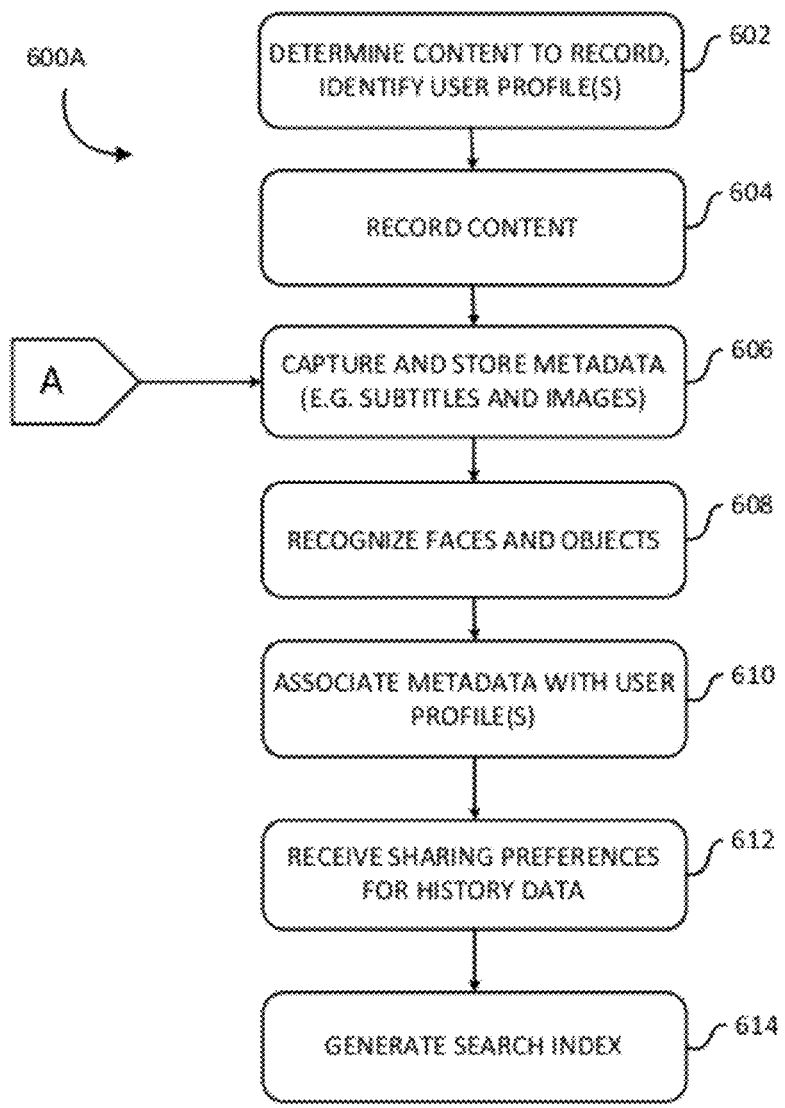
FIGS. 6A and 6B are flowcharts of exemplary processes for capturing information to allow a user to search for and discover content.
Figure 6B:
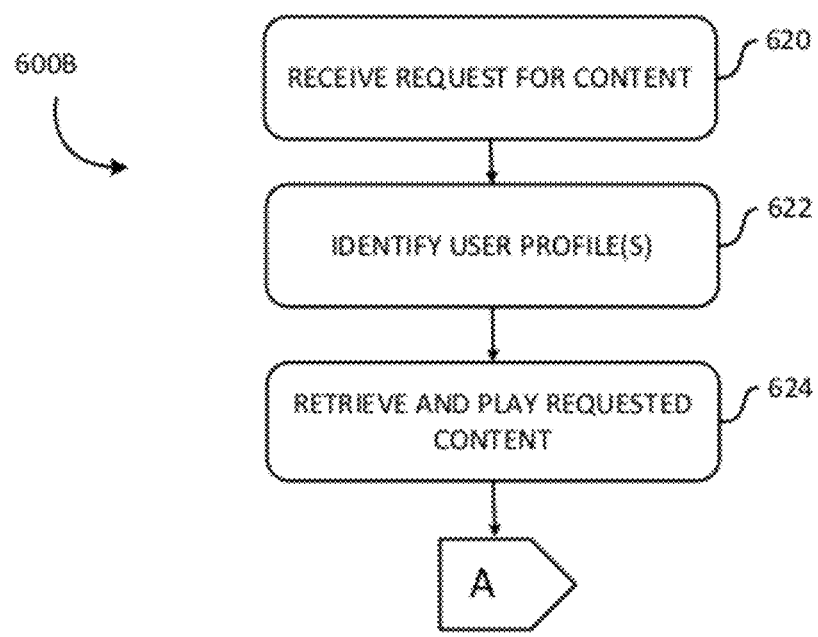
Figure 6C:
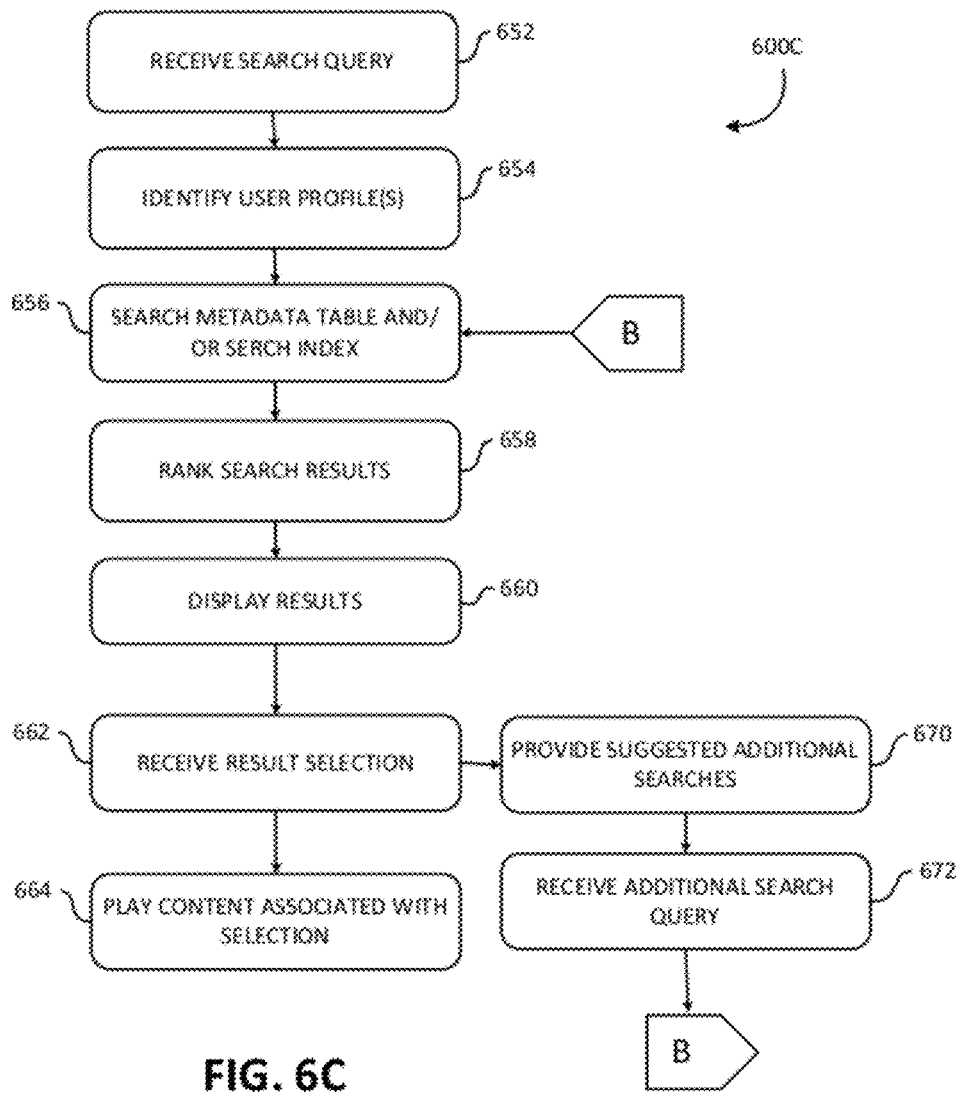
FIG. 6C is a flowchart of an exemplary process for a user to search for and discover content.

As described above, network 200 may allow a user (e.g., a customer in customer premises 250) to search for and discover content. In one embodiment, before searching for content, information about the content (e.g., dialog text, etc.) may be stored and/or indexed. FIGS. 6A and 6B are flowcharts of processes 600A and 600B for generating a search index. FIG. 6C is a flowchart of a process 600B for searching the content using the search index.

The following description of process 600A includes an example in which the user is a customer named John Smith. In this example, John sits in front of TV 258 at home (e.g., customer premises 250) and uses remote control 260 to control TV 258 and STB 256. STB 256 performs the functions of a DVR in the following example. In other embodiments, data center 210 may perform the functions of a DVR. Process 600A may begin with the user instructing STB 256 to record content. For example, John logs into his account (e.g., in social server 212) and browses a program guide using remote control 260 and STB 256. John then instructs STB 256 to record the program "Everybody Loves Carl." The identity of the content to record is received and the associated user profile is identified (block 602). In the current example, the content to record is "Everybody Loves Carl" (e.g., content ID of 0246467 in table 500) and the associated profile is John's (e.g., profile ID of 56945). In this example, profile logic 414 in STB 256 may identify John's profile by virtue of John logging into his account.

The content may be recorded (block 604) by, for example, STB 256 (e.g., stored in content storage 412). In the current example, when the program "Everybody Loves Carl" broadcasts, the program is recorded and stored in content storage 412. STB 256 (e.g., DVR/search logic 402) may also capture and store metadata (e.g., the subtitles and images) associated with the subtitles and the program being recorded (block 606). For example, the dialog text of the program "Everybody Loves Carl" may be transmitted with the audio and video of the program. DVR/search logic 402 may store this dialog text and associated images in, for example, metadata table 500. As shown in FIG. 5, captions field 510, the following dialog was captured in the second scene of "Everybody Loves Carl": "You're just in time. I believe I've created an algorithm for a social graph of friends." Captions field 510, in this example, also records the identity of the character speaking the dialog, and the associated time and thumbnail image.

Thumbnail images may be captured from video content during the middle of each character's dialog, for example, or at the beginning of each dialog. In one embodiment, a thumbnail image may be captured at the beginning of each scene. In another embodiment, a thumbnail may be captured for a scene at the middle of the first dialog of the scene.

In one embodiment, faces and objects in the content may be recognized and stored (block 608). Object recognition logic 415 may analyze images in content for faces and objects. A recognized face may be recorded in metadata table 500 by the person's name and a recognized object may be identified by the object's name. For example, metadata table 500 shows that three people are recognized in the second scene of "Everybody Loves Carl": Sean Haggerty, John Park, and Jake Gannon. These three people are the actors playing the parts of Carl, Liam, and Praveen in the corresponding program. Object recognition logic 415 also recognizes a Norton sofa as part of the second scene.

The metadata (e.g., content ID, subtitles, thumbnail images, face and object information) may be associated with user profile(s) (block 610). For example, the data in metadata table 500 may be associated with John, as indicated in presence field 512. In this case, John's profile ID is listed 56945, but because John has not yet watched the recording of "Everybody Loves Carl," presence field 512 shows "NONE."

A user may wish to allow others to search his or her viewing and/or recording history, but may also want to restrict who can search the history (e.g., search metadata table 500). Sharing preferences may received (block 612) from the user. In the current example, John may allow all his friends and family, as recorded in social server 212, to search content recorded or watched by John. Sharing preferences may be stored in social server 212, for example, and associated with John's profile.

In one embodiment, a search index may be generated (e.g., created or supplemented) (block 614). STB 256 (e.g., search engine 408) may generate search index 410 from program metadata database 404 to allow for speedier searching.

Although process 600A has been described with STB 256 providing the DVR and other functions, as mentioned above, these functions may be performed "in the cloud" by data center 210 (e.g., search server 216 and content storage server 214) and provided "over the top" to a user device, such as mobile device 270. For example, DVR/search logic 422 may determine the content to be recorded (block 602) and record the content to content storage server 214 (block 604). Search logic 422 may capture and store subtitles in program metadata database 430 (block 606) and object recognition logic 426 may recognize faces and objects (608). Search logic 422 may associate the metadata with the user profiles (block 610). In one embodiment search logic 422 may associate the metadata with the user profiles in conjunction with profile logic 414 in STB 256. Search engine 424 may generate search index 428 (block 614) from metadata database 430. Content searching and playing app 444 in, for example, mobile device 270 or STB 256 may provide the user interface for the user to interact with data center 210.

In one embodiment, a user may request the playing of content that is currently being broadcast or content that has already been recorded. FIG. 6B is a flowchart of exemplary processes 600B for capturing metadata (e.g., dialog text in subtitles) in these situations. The following example assumes that Mary Smith (profile ID of 68297) watches the first, second, and third scene of "Everybody Loves Carl" (content ID of 0246467) and that Jane Smith (profile ID of 59435) watches the entire program. Both Mary and Jane watch the program in front of TV 258 and STB 256. Again, in the following example, STB 256 performs DVR and search functions. In other embodiments, DVR and search functions may be performed in data center 210.

In this case, a request for content may be received (block 620). In the current example, Mary and Jane may request to watch the program "Everybody Loves Carl" during a broadcast or may watch the program that was recorded by John Smith. The current user profile(s) may be identified (block 622) for associating with the recorded content and metadata. In one embodiment, profile logic 414 in STB 256 may identify the profiles of users in front of or nearby TV 258. Profile logic 414 may identify the users in numerous ways. In one implementation, users may carry a device (e.g., on a keychain, in mobile device 270, in a watch, etc.) that includes an RFID tag that identifies the user. In this example, if the RFID tag is detected in front of or nearby TV 258, then the profile associated with the RFID tag may be identified as a current profile. In another embodiment, users may carry a device (e.g., a PDA, watch, mobile device 270, etc.) that includes a radio (e.g., a WiFi radio, a GSM radio, etc.). If a hardware address (e.g., a MAC address) of the radio is detected in front of or nearby TV 258, then the profile associated with the hardware address may be identified as a profile. In another embodiment, profile logic 414 may use a microphone and voice recognition, a camera and facial recognition (e.g., object recognition logic 415), or another type of biometric recognition, to determine the users in front of or nearby TV 258. In this case, profile logic 414 may identify profiles associated with the recognized users. As yet another example, a user may select a profile by "logging in" to an account associated with the profile. In the current example, profile logic 414 may recognize Mary and Jane, and their associated profiles, as watching "Everybody Loves Carl."

The current user profile(s) (block 622) may be identified continuously, on a regular basis (e.g., once every minute or once every 5, 15, 20, 25, 30, 45, or 60 minutes), or in response to certain events. In the current example, profile logic 414 may determine that Mary's profile (e.g., ID of 68297) is a current profile and Jane's profile (ID of 59435) is also a current profile. If Mary is watching the program but leaves the room after the third scene, then the current user profile(s) (block 622) may be detected (e.g., leaving only Jane with profile ID of 59435) in response to Mary leaving the room.

The requested content may be retrieved and played (block 624). In the current example, "Everybody Loves Carl" may be retrieved from content storage 412 (e.g., if John has already recorded the program) in STB 256 or from the live broadcast (if John has not recorded the program or if Jane and Mary watch it during a recording). Process 600B may proceed to block 606 in FIG. 6A where subtitles and images are captured (block 606) and faces and objects are recognized (block 608). If the content has already been recorded, then the thumbnail images, subtitles, recognized objects, and recognized images may already be stored in metadata table 500. If the content has not yet been recorded, then search logic 402 and/or object recognition logic 415 may capture and store the thumbnail images, subtitles, recognized objects, and recognized faces as described above.

The metadata may be associated with the appropriate user profiles (block 610). In the current example, as shown in presence field 512 of metadata table 500, Mary and Jane are associated with the program titled "Everybody Loves Carl." Mary is associated with the first three scenes (as determined by profile logic 414) and Jane is associated with all the scenes (as determined by profile logic 414). As describe above, search logic 402 may receive sharing preference from Mary and Jane (block 612) and a search index may be generated (block 614), if a search index has not already been generated previously.

Although process 600B has been described with STB 256 providing the DVR and other functions, as mentioned above, these functions may be performed "in the cloud" by devices in data center 210 (e.g., search server 216 and content storage server 214). For example, DVR/search logic 422 may receive the request for content (block 620) and identify the user profiles (block 622). Content may be retrieved (block 624) from content storage server 214. Content may be played (block 624) on the user device by content searching and playing app 444. App 444 may also provide the user interface for the user to interact with devices in data center 210. As with process 600A, search logic 422 may associate the metadata with the user profiles in conjunction with profile logic 414 in STB 256. DVR/search logic 422 may transmit the requested content to STB 256, for example, for playing the content (block 624). As described above, the DVR and other functions for blocks 606 through 614 may also be performed in data center 210.

As discussed above, processes 600A and 600B allow for network 200 to collect information (e.g., metadata) so that a user may search for, discover, and play content. After capturing metadata for a program in processes 600A and/or 600B, a user may wish to search for content. FIG. 6C is a flowchart of an exemplary process 600C for a user to search for, discover, and play content based on the information collected, for example, in process 600A or 600B. In the following example, process 600C is performed by STB 256. In other embodiments, process 600C may also or alternatively be performed by data center 210 and mobile device 270, for example. John Smith searches for content as discussed above with respect to FIG. 1. The user can search for terms appearing in the dialog of content, for example, as that dialog was captured in processes 600A and 600B. As shown in FIG. 1, John enters "friendship" and "algorithm" in search box 103. The user may limit the search to, for example, content that the user has already watched (e.g., according to presence field 512) or programs that the user recorded but has not watched yet (e.g., also according to presence field 512). John limits his search to recorded or viewed content (as indicated by checkmarks in options box 104) in the current example. In one embodiment, the user can specify that the dialog search terms appear in a single scene. The user can also specify whether to search in friends' content (e.g., or content of any other group defined by social server 212). In yet another embodiment, a user can search for all content (e.g., all content available to the user).

A query may be received (block 652) from the user. In the current example, the query includes the criteria in search box 103 and options box 104. The relevant user profile(s) (block 654) may be identified. For example, STB 256 may identify John's profile because he is the one present in front of TV 258 or because he is logged into social server 216. Metadata database 404 (e.g., metadata table 500) and/or search index 410 may be searched according to the search query (block 656). In the current example, STB 256 searches finds three search results as shown in FIG. 1. The results may be ranked (block 658). STB 256 may rank the search results according to a number of criteria. For example, content associated with the user may be ranked higher than content associated with the user's friends, or vice versa. Content associated with advertisements may be ranked higher than content not associated with advertisements. Content with search terms appearing closer together may be ranked higher than other content.

The results are displayed (block 660) by STB 256 on TV 258, for example. As shown in FIG. 1, three search results 106, 108, and 110 are displayed: "Everybody Loves Carl," "The New France," and the "Evening News." The dialog, if any, may also be displayed. In this case, words in the displayed dialog that match the search terms may be highlighted, as shown in FIG. 1. Each search result in FIG. 1 is associated with a thumbnail image (e.g., 112, 114, and 116). The user may select a search result, which the STB 256 receives (block 662). John selects result 106 (e.g., by clicking or touching search result 106 or image 112).

Figure 7A:
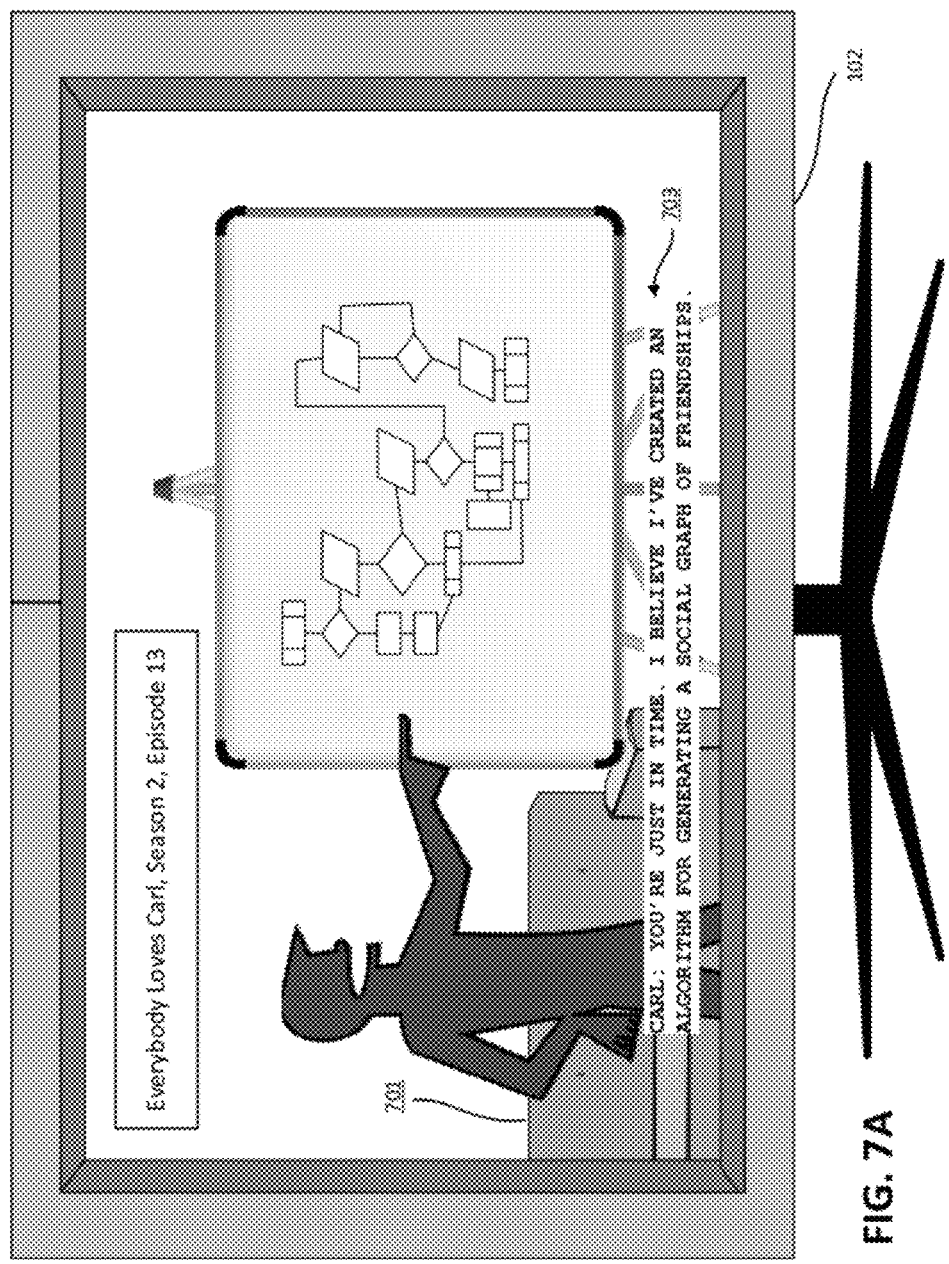

In one embodiment, after a search result selection is received (block 662), the content associated with the selected search result is fetched and played (block 664). For example, as shown in FIG. 7A, the content associated with search result 106 is played on display 102 (e.g., TV 258, mobile device 270, or display 255 of personal computer 254). In this embodiment, playback may begin with the scene in which the search result is found (e.g., scene two of "Everybody Loves Carl"). As shown in FIG. 7A, display 102 includes subtitles 703 that, when compared to metadata table 500, indicate that playback has begun at the start of scene two. In another embodiment, subtitles 703 are not displayed.

In another embodiment, after a search result selection is received (block 662), additional searches may be suggested to the user (block 670). For example, as shown in FIG. 7B, the user is presented with a window 702 that includes search result 106. The user may begin playback of the search result by clicking or touching on window 702, for example. As with FIG. 7A, playback may begin at the scene of the program "Everybody Loves Carl" that matched the search criteria (e.g., scene two). The user is also presented with other search options with buttons 704 and 708 and windows 706 and 710. Because metadata table 500 indicates that object recognition logic 415 recognized a Norton sofa, search logic 402 (e.g., in conjunction with ad server 232) recommends searching for a Norton sofa in a window 706. A user may click on window 706 to shop for (e.g., search for) that Norton sofa. In window 708, search logic 402 also recommends searching for other video programs that show the same sofa. By clicking on any of buttons 704, for example, the user may search for other video programs with the same, recognized, actors. As shown in window 710, a context-specific advertisement is shown. In this case, John is presented with an advertisement for a router, presuming that the viewers of scene two would be interested in routers based on other information in social server 212, for example. In one embodiment, the user may select to search for all content, regardless of whether the user has viewed the content or recorded the content.

In this embodiment, an additional search query may be received (block 672). The additional search query may include, in this example, any of the searches generated by selecting buttons 704 and 708 or windows 706 and 710 described above. The search result may be processed according to blocks 656 through 670 described above.

Although process 600C has been described with STB 256 providing the search and playing content functions, these functions may be performed by devices in data center 210 (e.g., "in the cloud"). For example, search logic 422 may receive the search query (block 652), identify the user profiles (block 654), search metadata table 500 and/or search index (block 656), and rank the search results (block 658). The search results may be displayed on mobile device 270, personal computer 254, and/or STB 256 by content searching and playing app 444. App 444 may also receive result selection (block 662) and play content (block 662). Search logic 422 in search server 216 may suggest additional searches (block 670). App 444 may display additional search queries (block 670), and/or receive additional search queries (block 672).

One embodiment described above provides much functionality in STB 256 and another provides functionality in data center 210 with a light-weight app 444 in the user device (e.g., STB 256 or mobile device 270). In other embodiments, functionality may be distributed differently between data center 210 and a user device (e.g., STB 256). For example, content may be stored in STB 256, while metadata (e.g., dialog text) may be stored in data center 210. Or, content may be stored in data center 210 while metadata (e.g., dialog text) may be stored in STB 256. Functions, such as complex object recognition, may be performed in data center 210, while other functions may be performed in STB 256.

While search criteria for content described above include keywords, watched, unwatched, recorded, not recorded, scenes only, friends content, etc., other search criteria are possible. For example, a time window may be specified as search criteria (e.g., viewed content from Mar. 1, 2009 to Apr. 1, 2009). A particular friend may be specified as criteria (e.g., content viewed by a particular friend on a particular date). A particular actor may be specified as a criteria (e.g., content in which "Angelina Jolie" appears). A particular character may be specified (e.g., content in which Spiderman" is a character). In one embodiment searching for "all" content that matches criteria means searching for all content provided by a service provider to the user (e.g., all the channels and programs to which a user subscribes).

Embodiments disclosed herein may allow a user to search for content that match criteria that he has recorded or viewed. Embodiments may also allow for a user to search for content that match criteria associated with a friend. Embodiments may allow for a user to search content (all content available to him) that match criteria.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Further, certain portions of the invention may be implemented as logic that performs one or more functions. This logic may include hardware, such as an application specific integrated circuit, a field programmable gate array, a processor, or a microprocessor, or a combination of hardware and software.

No element, act, or instruction used in the description of the present application should be construed as critical or essential to the invention unless explicitly described as such. Also, as used herein, the articles "a" and the term "one of" are intended to include one or more items. Further, the phrase "based on" is intended to mean "based, at least in part, on" unless explicitly stated otherwise.

What is claimed is:

1. A computer-implemented method comprising:
receiving requests to play a plurality of programs, wherein each program of the plurality of programs is associated with a plurality of scenes and each scene is associated with dialog text;
storing a plurality of profiles, wherein each profile of the plurality of profiles is associated with a corresponding one of a plurality of users;
playing the programs and determining whether a particular user of the plurality of users is present during the playing of each scene of each program of the plurality of programs and determining a particular profile, of the plurality of profiles, corresponding to the particular user based on the determining of whether the particular user of the plurality of users is present;

associating, in response to receiving the requests, each scene of the plurality of scenes during which the particular user was present and the corresponding dialog text during which the particular user was present with the particular profile;

receiving a search query from the particular user associated with the particular profile;

searching the dialog text associated with the particular profile for dialog text that matches the search query; and transmitting, for display, an identification of the program and the scene associated with the matching dialog text, wherein associating each scene of the plurality of scenes during which the particular user was present and the corresponding dialog text during which the particular user was present with the particular profile includes storing an indication that the particular user was present during the playing of the scene associated with the dialog text, wherein searching the dialog text associated with the particular profile includes excluding searching of dialog text not associated with the indication that the particular user was present during the playing of the scene, wherein the particular profile is associated with less than all of the plurality of scenes of one of the programs, and wherein searching the dialog text associated with the particular profile for dialog text that matches the search query includes recognizing, by a computing device, an object in one of the scenes with the matching dialog text and wherein the object does not match the search query.

2. The computer-implemented method of claim 1, further comprising: receiving a request from the particular user, in response to transmitting the identification of the program and the scene associated with the matching dialog text, to play the program and the scene associated with the matching dialog text; and playing the program and the scene associated with the dialog text starting at a time corresponding to the matching dialog text.

3. The computer-implemented method of claim 1, further comprising: associating a different plurality of images with each program of the plurality of programs, wherein each image is associated with a different grouping of dialog text; and determining one of the plurality of images, for displaying to the particular user, associated with the matching dialog text.

4. The computer-implemented method of claim 1, further comprising: determining that two users of the plurality of users is present during the playing of one of the scenes of one of the programs and determining two profiles of the plurality of profiles corresponding to the two of the two users; and
    associating the one of the scenes of the one of the programs during which the two users were present and the corresponding dialog text with the two profiles.

5. The computer-implemented method of claim 1, further comprising transmitting identifications of more than one of the programs associated with matching dialog text; and ranking the more than one of the programs for displaying according to rank.

6. The computer-implemented method of claim 5, wherein ranking the more than one of the programs includes ranking according to preference of the particular user stored in the particular profile.

7. The computer-implemented method according to claim 5, further comprising:
    associating a different plurality of images with each program of the more than one of the programs, wherein each image is associated with a different grouping of dialog text associated with each program; and
    determining, for each program of the more than one of the programs and, one of the plurality of images associated with the matching dialog text for displaying to the particular user.

8. The computer-implemented method of claim 1, wherein determining the particular user present during the playing of each scene of the plurality of scenes includes detecting and recognizing a face of the particular user.

9. The computer-implemented method of claim 1, wherein determining the particular user present during the playing of each scene of the plurality of scenes includes detecting a radio-frequency identifying tag or a media access address of a device associated with the particular user.

10. A network device comprising:
    a receiver to receive requests to play a plurality of programs, wherein each program of the plurality of programs is associated with a plurality of scenes and each scene is associated with dialog text;
    a memory to store a plurality of profiles, wherein each profile of the plurality of profiles is associated with a corresponding one of a plurality of users;
    a processor to
        instruct playing the programs on a display, determine whether a particular user of the plurality of users is present during the playing of each scene of each program of the plurality of programs and determining a particular profile, of the plurality of profiles, corresponding to the particular user based on the determination of whether the particular user of the plurality of users is present, and
        associate, in response to receiving the requests, each scene of the plurality of scenes during which the particular user was present and the corresponding dialog text during which the particular user was present with the particular profile;
    wherein the receiver is configured to receive a search query from the particular user associated with the particular profile;
    wherein the processor is configured to search the dialog text associated with the particular profile for dialog text that matches the search query; and
    a transmitter to transmit, for displaying on the display, an identification of the program and the scene associated with the matching dialog text,
    wherein when the processor associates each scene of the plurality of scenes during which the particular user was present and the corresponding dialog text during which the particular user was present with the particular profile, the processor is configured to store an indication that the particular user was present during the playing of the scene associated with the dialog text,
    wherein when the processor searches the dialog text associated with the particular profile, the processor is configured to exclude searching of dialog text not associated with the indication that the particular user was present during the playing of the scene,
    wherein the particular profile is associated with less than all of the plurality of scenes of one of the programs, and
    wherein when the processor searches the dialog text associated with the particular profile for dialog text that matches the search query, the processor is configured to recognize an object in one of the scenes with the matching dialog text and wherein the object does not match the search query.

11. The network device of claim 10, wherein the object is an inanimate object,
wherein the receiver is configured to receive, from the user, a selection of the identified program associated with the matching dialog text and a selection of the object,
wherein the processor instructs a display to play the selected program starting at a time corresponding to the matching dialog text, and
wherein the processor is configured to perform a search, based on the selection of the object, and wherein the transmitter is configured to send results of the search based on the selection of the object for display to the user.

12. The network device of claim 10, wherein the memory is configured to store the dialog text associated with each scene of a plurality of scenes of each program of the requested programs, and an indication of whether the user was present during playing of each of the scenes of each program of the requested programs; and
wherein the processor is further configured to:
associate each program with a different plurality of images and associate each image with a different group of dialog text and
select an image, associated with the matching dialog text, for each identified program associated with the matching dialog text.

13. The network device of claim 10, wherein the memory is configured to store the dialog text associated with each scene of a plurality of scenes of each of the requested programs, and an indication of whether the user was present during playing of each of the scenes of each of the requested programs; and
wherein the processor is configured to associate the dialog text associated with the requested programs with a group of users, wherein each user is associated with privileges to search through the dialog text associated with the requested programs.

14. The network device of claim 10 further comprising a display for displaying the identification of the program associated with the matching dialog text, wherein the display highlights the matching dialog text.

15. The network device of claim 10, wherein the receiver is configured to receive a request from the particular user, in response to transmitting the identification of the program and the scene associated with the matching dialog text, to play the program and the scene associated with the matching dialog text; and
wherein the processor is configured to instruct the playing of the program and the scene associated with the dialog text starting at a time corresponding to the matching dialog text.

16. The network device of claim 10, wherein the processor is configured to associate a different plurality of images with each program of the plurality of programs, wherein each image is associated with a different grouping of dialog text; and wherein the processor is configured to determine one of the plurality of images, for displaying to the particular user, associated with the matching dialog text.

17. The network device of claim 10, wherein the processor is configured to determine that two users of the plurality of users are present during the playing of one of the scenes of one of the programs and configured to determine two profiles of the plurality of profiles corresponding to the two of the two users; and wherein the processor is configured to associate the one of the scenes of the one of the programs during which the two users were present and the corresponding dialog text with the two profiles.

18. The network device of claim 10, wherein the transmitter is configured to transmit identifications of more than one of the programs associated with matching dialog text; and wherein the processor is configured to assign a rank the more than one of the programs for displaying according to the rank based on a particular preference of the particular user stored in the particular profile.

19. The network device of claim 18, further comprising:
a display to display, according to the rank, the identifications of one or more programs associated with matching dialog text.

20. The network device of claim 18, wherein the processor is configured to associate a different plurality of images with each program of the more than one of the programs, wherein each image is associated with a different grouping of dialog text associated with each program; and
wherein the processor is configured to determine, for each program of the more than one of the programs and, one of the plurality of images associated with the matching dialog text for displaying to the particular user.

21. The network device of claim 10, wherein the processor is configured to determine the particular user present during the playing of each scene of the plurality of scenes by detecting and recognizing a face of the particular user, or wherein the processor is configured to determine the particular user present during the playing of each scene of the plurality of scenes by detecting a radio-frequency identifying tag or a media access address of a device associated with the particular user.

* * * * *